April 1, 1952   M. W. DITTO ET AL   2,591,240
APPARATUS FOR PRODUCING AN EMBOSSED COATING ON SHEET MATERIALS
Original Filed Sept. 25, 1947
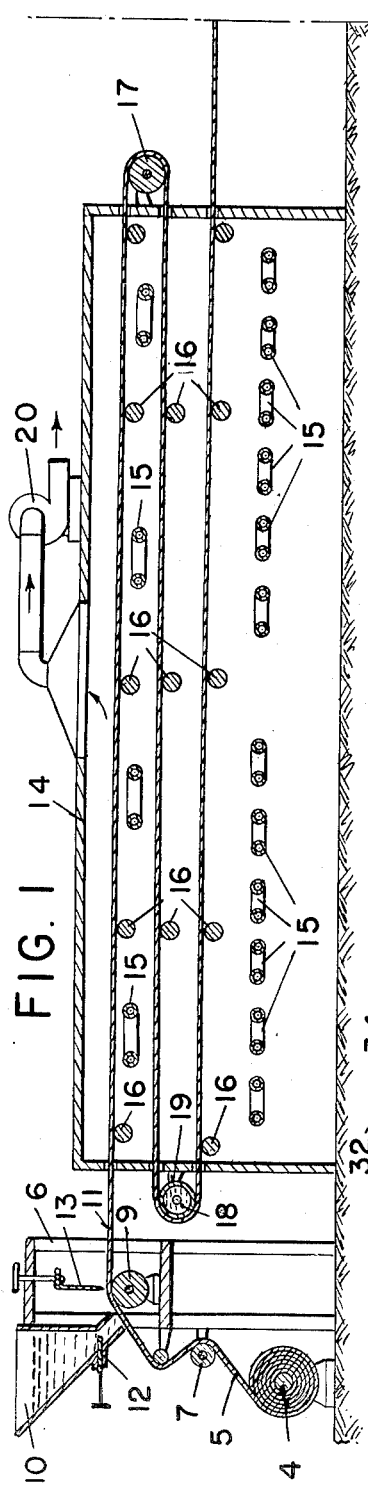
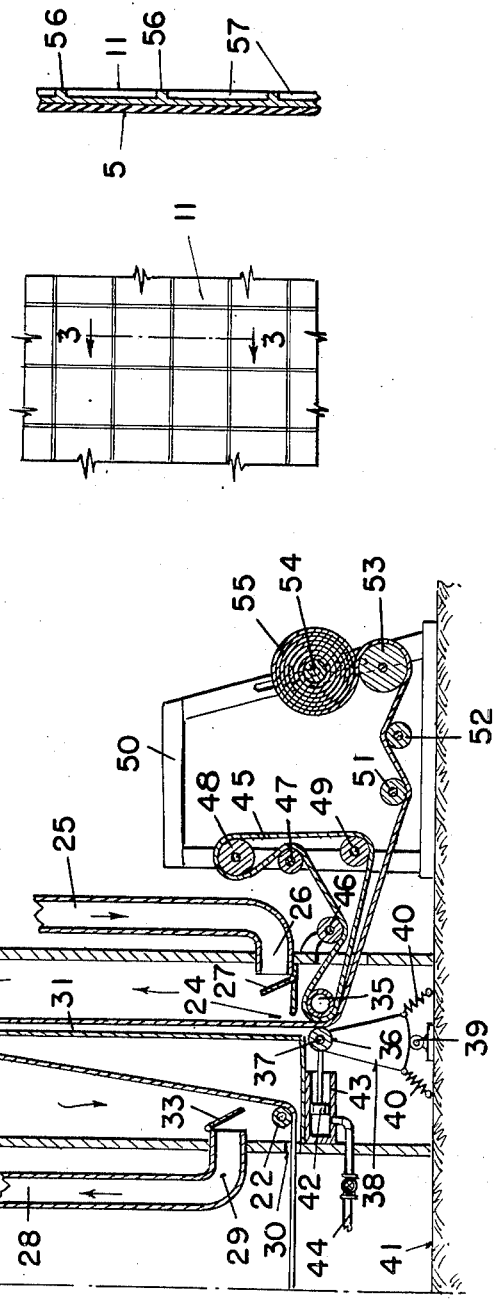
INVENTORS
Marvin W. Ditto,
Richard H. Hugger,
By Lloyd P. Shaub
Attorney

UNITED STATES PATENT OFFICE 2,591,240

APPARATUS FOR PRODUCING AN EMBOSSED COATING ON SHEET MATERIALS

Marvin W. Ditto, New York, N. Y., and Richard H. Hugger, Ridgewood, N. J., assignors to Cordo Chemical Corporation, Norwalk, Conn., a corporation of Connecticut Original application September 25, 1947, Serial No. 776,132. Divided and this application July 19, 1949, Serial No. 105,562

7 Claims. (Cl. 118—101)

The present invention relates to improvements in apparatus for embossing sheet materials coated with a film of a thermoplastic resin or the like. This application is a division of our copending application, Serial No. 776,132, filed September 25, 1947, and now abandoned.

One of the objects of the invention is to provide apparatus for embossing sheet material provided at least at one side thereof with a coating of thermo-plastic resin, such as vinylite, which coating is embossed to simulate textile fabrics such as satin, grosgrain silk, tapestry brocade, or leather, such as pinseal, Scotch grain, alligator, or the like.

Heretofore, in manufacturing such sheet material, it has been common to coat a base web with a film of thermo-plastic material and then as another operation pass the resulting laminated sheet between embossing rolls, at least one of which has an engraved or etched surface of the design or figure to impart to the thermoplastic material whatever effect is desired.

In order to make an impression with such an embossing roll when using a vinylite type of resin, it is necessary that the rolls be at temperatures up to 375° F. It is also essential to exert substantial pressure upon at least one of the rolls to give any permanency in the embossed effect.

Assuming that the fabric is to be coated with a resin such as co-polymer vinylite resin, and that such resin has been applied to a paper or fabric sheet or web on a conventional coating machine, we pass the coated web through a preheating zone having a temperature of approximately 225° F. Immediately afterwards, the coated base is passed through a zone at a more elevated temperature of the order of 375° to 425° F. Assuming that the coating material is composed of resin, a plasticizer, and a coloring pigment, to give it a solid content of 82% to 90%, the coated material will be devolitilized to a major extent in the pre-heating zone or drying oven and will be completely devolitilized in the high temperature zone or oven. In the latter, the temperature is sufficient to cause thermal fusion of the plastic and plasticizer elements of the compound. We have found that if the coated sheet material when leaving the high temperature zone is brought in contact with a coolant containing embossing belt or roll, designs chosen for the purpose of simulating a textile fabric or a leather surface and carried by the belt or roll, are imprinted in the soft resin surface and as the result of cooling, the embossed designs on the coating become permanent.

A still further object of our invention is to provide apparatus for producing such embossed materials continuously and of a new material which requires much higher temperatures than the thermo-plastics used in the past. Our material, referred to specifically as the vinylite copolymer, which may be compounded in the form of an organosol and applied to the base or web by any conventional coating equipment, such as roller coaters, suspended knife coating, or reverse roll coaters. The organosols of the vinylite contain 14 to 16% of volatile matter which must be eliminated before the material will properly react to reach a point of fused stabilization, and this volatile material is largely driven off in passing through the pre-heating oven which, for this particular material, is maintained at a temperature of 250° to 300° F., while the coated sheet is exposed to such temperatures for about one minute. After passing through the pre-heating oven, the sheet material is passed through the zone of higher temperature (375° to 450° F.) where it is completely devolitilized and the coating is fused into a strong film upon the fabric.

In the past, if embossing rolls were employed, the coated fabric was devolatilized at lower temperatures than those required for these vinylite resin compositions and the sheet material was allowed to cool and the embossing was done as a separate operation.

When the embossing was to be performed, the web with its coating was generally contacted with an embossing roll carried at an elevated temperature and heat was transmitted by the roll to the web during the time pressure was being exerted by the rolls. In some instances, it was found advantageous to pre-heat the coated web before approaching the point of contact with the embossing roll, but to set the embossed sheet material, it was absolutely essential to transmit heat from the embossing roll to the coated web.

An embossing roll with its companion roll to carry the web forward and emboss it at the same time, covers a relatively small area of the web at each revolution of the embossing roll. In apparatus according to the present invention, we obviate the objection of depending on the heat transmitted from the embossing roll to the plastic surface, and we obtain the desired result in exactly the reverse set of conditions because we emboss during the absorption of heat from the web, by the embossing element instead of transmitting heat to the web as in former practice.

In accordance with our invention, we make a belt of satin, grosgrain silk, tapestry, brocade, finished leather, or the like, and such belt while passing a cooled roll or the like is brought into contact with the thermo-plastic coating while the latter is in proper condition to be embossed. Instead of using a belt of such fabrics or finished leather, we find it desirable, especially where the original fabric is of expensive material, to use the negative impression resulting from the use of the original fabric as a negative to reverse the impression to obtain a positive which places the relative elevations of the surface of the coated material at the same positions as they were on the original fabric. In accomplishing this, after the impression is made on a coated web, a belt is made from such coated material and this belt is used as an embossing medium to transfer the impression to another or new film of thermo-plastic material in order to restore the impression from the negative to the positive relationship. This is practical and positive because of the fact that the embossing surface or belt is cooled below the softening temperature of the coating, as a result of passage around the surface of a cooled roll and the very short period of contact with the heat bearing material to be embossed. Therefore, we obtain a faithful reproduction of any distortion resulting from the production of the negative from the original fabric.

With the foregoing objects outlined and with other objects in view which will appear as the description proceeds, the invention consists in the novel apparatus hereinafter described in detail, and in the apparatus illustrated in the accompanying drawings, in which:

Fig. 1 is a vertical longitudinal sectional view of the coater head and pre-heating oven of the apparatus.

Fig. 1a is a similar view of the fusion oven, embossing means and wind-up mechanism.

Fig. 2 is a face view of a fragment of the finished sheet to illustrate an example thereof.

Fig. 3 is an enlarged sectional view of a detail taken on the line 3—3 of Fig. 2.

Referring to the drawing, 4 designates a reel on which is wound a web 5 of any suitable sheet material that is unwound from the reel by a wind-up mechanism, hereinafter referred to. There is shown at 6 a conventional coater head provided with spaced horizontally disposed rolls 7 and 9 about which the web passes during the coating operation. The thermo-plastic resin such as vinylite co-polymer is discharged from a hopper 10 or the like onto the web to form a film or coating 11 entirely covering one side thereof, and the thickness of the film may be partially controlled by a valve 12 cooperating with the hopper. A spreader knife 13 forms part of the coater head and functions to spread the resin on the web and to control the final thickness of the coating.

After leaving the coater head, the coated web passes into one end of a pre-heating oven 14, the interior of which is maintained at a desired temperature (150° to 300° F.) by any suitable means, such as steam conducting coils 15. In the oven, the web is supported by tiers of horizontal rolls 16 and while passing in reverse directions through the oven, the coated web passes about horizontal idler rolls 17 and 18 journalled at the ends of the oven. As the roll 18 must contact the heated coating, it is preferably heated by hot water or the like, indicated at 19.

Vapors driven from the coating are drawn from the top of the oven by means of an exhaust fan 20 which also functions to draw air into the oven through the openings through which the coated web enters and leaves the oven, and the air after being heated within the oven is thus circulated or caused to travel, by the exhaust fan.

The coated material after being partially devolatilized in the pre-heating oven, is immediately passed while in pre-heated condition from the oven 14 to the fusion oven 21 (Fig. 1a), in which it passes under a horizontal roll 22, arranged at the lower end of the oven, and over a horizontal roll 23 positioned at the top portion of the oven. From the roll 23, the coated sheet passes down and out of the oven through an opening 24 at the bottom thereof.

The oven is provided at one side with an intake pipe 25 through which air heated to a temperature to the order of 375° to 450° F. is forced into the oven through a nozzle 26 positioned adjacent to the web outlet 24. Such nozzle is controlled by a damper 27, and the hot air blown through the nozzle immediately contacts the web coating and travels up the oven along one wall thereof before travelling downwardly to be discharged through a pipe 28 that has an intake 29 positioned adjacent to the web inlet 30. A vertical partition 31 is arranged in the oven and extends upwardly from the bottom thereof into close proximity to the roll 23 to cause the hot air to travel first upwardly and then downwardly. Vapors evolved from the coating within the oven 21 can be discharged through the pipe 28, and for temperature regulation and vapor discharge, the oven is preferably provided at its top with a pipe 32, and the pipes 28 and 32 are provided respectively with dampers 33 and 34.

Immediately below the web outlet 24 of the oven, we arrange the embossing mechanism and it preferably consists of a cooled roll 35, revolving about a fixed axis, and a pressure roll 36, revolving about a shiftable axis or axle 37. The axle is preferably journalled in a pivoted support 38 arranged to turn about a horizontal shaft 39. Springs 40 connecting the pivoted support to a base 41, function to normally maintain the support 38 in a vertical position. For urging the pressure roll 36 toward the cooled roll 35, we may employ a piston 42, connected to the upper end of the support 38, and working in a stationary cylinder 43, supplied with a pressure fluid through a conduit 44.

Roll 35 may be cooled by any suitable medium such as cold water or the like, and it acts as a guide for an embossing belt 45. This belt, as heretofore mentioned, may be made of a textile fabric bearing a design or pattern to be imparted to the coating on the web, or the belt may be of leather having a finish such as pinseal, Scotch grain, alligator, or the like, to be imparted to the coating. The belt passes not only about the cooled roll 35, but also about idler rolls 46, 47, 48 and 49, the last three rolls being preferably journalled in the frame 50 of a wind-up mechanism. Such mechanism has idler rolls 51 and 52, under and over which the finished material passes before contacting a driven roll 53 which cooperates with a driven reel 54 to draw the web through the apparatus and to finally wind it into a roll 55.

In operation, it will be understood that the vinylite co-polymer coating or the like after being placed on the web 3, is forced into contact with the web by the doctor blade 13 which spreads the coating and imparts the desired thickness thereto. The web by means of the wind-up mechanism is caused to travel at a rate from 10 to 20 yards per minute, and shortly after leaving the coater head, the coated web enters the drying or pre-heating oven 14 where the temperature of the coated web is raised to from 150° to 350° F. depending upon the pressure of the steam introduced into the coils 15. Upon exit from the drying oven, the coated web while in pre-heated condition, is immediately passed into the fusion oven 21 where it is contacted with hot air at a temperature as high as 425° F. The coated web passes through the oven 21 in from one quarter to one and a half minutes as we have found that this time at such temperatures is sufficient to thoroughly fuse the coating so that such coating will be impressed by the embossing belt 45 while the belt and coated web pass between the cooled roll 35 and pressure roll 36 immediately upon exit from the fusion oven.

Assuming that the material to be used for coating the fabric is that disclosed in application, Serial No. 611,866, filed August 21, 1945, it will be necessary to eliminate the volatile matter in the organosol mainly or entirely in the oven 14 so that the function of the thermal reaction in the fusion oven 21 will result in fusing the resin with its plasticizer to form a plastic film upon the web. As soon as such fusion takes place, the coated web leaves the fusion zone and is immediately introduced between the rolls 35 and 36 while the coating is in its most favorable soft state to receive the desired surface finish. As roll 35 is cooled, the fused coating while being finished or embossed, solidifies permanently into its finished form.

In prior practice, once the fabric has been coated, it has been allowed to cool and passed between calendaring rolls, one of which is an embossing roll maintained at a temperature of 350° to 370° F., and this hot roll caused the plastic material to soften and flow while undergoing embossing by the embossing roll. In some instances, the web was pre-heated before contact with the embossing roll, thereby eliminating the necessity of supplying all of the heat to melt the plastic material from the rolls themselves. Our apparatus eliminates the necessity for introducing calendaring rolls and embossing rolls and we thereby also eliminate the necessity of heating such rolls. In accordance with our apparatus, the coating is devolatilized and then brought to a state of fusion before contact with the embossed surface of a belt 45 or the like, and at the time of such contact, the coated material is cooled and subjected to sufficient pressure to permanently impart the surface configuration of the belt or the like to the coating or film.

As shown in Figs. 2 and 3, the coating 11 on the web 5, during embossing, is provided with raised portions 56 and depressed portions 57 and it will be obvious that such surface ornamentation will accord with the finish of the fabric employed as the belt 45. If the fabric of the belt is of expensive silk, tapestry, brocade, or the like, we prefer to use it only initially to impart a negative finish to the coating 11. Afterwards, the coated web so finished may be used to make a substitute belt and then that belt, when placed on the machine, as indicated at 45 in Fig. 1a, will function to impart a positive surface finish to the coating 11 of the other sheet material. This is possible because the belt 45 even though including a thermo-plastic film, is not introduced into the oven but is maintained in a cold condition while contacted with the fused coating on the coated web leaving the fusion oven.

From the foregoing, it is believed the general organization and the details of the apparatus may be readily understood and we are aware that changes may be made in the details disclosed without departing from the spirit of the invention, as expressed in the following claims.

What we claim and desire to secure by Letters Patent is:

1. In an apparatus of the character described, a fusion oven, said oven having an inlet opening, means for guiding a web through said inlet opening and through the oven, means for introducing a heated gas into and for discharging the heated gas from the oven, said oven having a web outlet, a cooled roll arranged in close proximity to said outlet, guide rolls, an embossing belt passing about said guide rolls and said cooled roll, a pressure roll to force the web toward the cooled roll, means for pressing the pressure roll toward the cooled roll, and means for drawing the web through the oven and between the cooled and pressure roll.

2. An apparatus as claimed in claim 1, including means for controlling the heated gas passed through the oven.

3. In an apparatus of the character described, a fusion oven having a web discharge opening and an inlet opening for the web, a cooled roll arranged in close proximity to said discharge opening, guide rolls, an embossing belt trained about the guide rolls and the cooled roll, a pressure roll for forcing a web against the cooled roll, means for forcing the pressure roll toward the cooled roll for pressing a web against the belt as the web is discharged from the opening of the oven, and means for winding a web and for pulling it through the oven and between the cooled roll and the pressure roll.

4. An apparatus of the character described comprising, a pre-heating oven provided with means for guiding a web coated with thermoplastic material through the oven in zigzag fashion, means at the intake end of the oven for applying a film of thermo-plastic material to the web, a fusion oven arranged at the outlet end of the pre-heating oven, web guiding means in the fusion oven for causing the web to travel in reverse directions, means for introducing a heated gas into the fusion oven at one point and for discharging the same from the oven at a point remote from the first-mentioned point, said fusion oven having a web outlet arranged adjacent to the means for introducing heated gas, a cooled roll arranged in close proximity to said outlet, guide rolls, an embossing belt trained about the guide rolls and the cooled roll, a pressure roll for forcing a web toward the cooled roll and into contact with the belt as the web is discharged from the fusion oven, and winding mechanism for drawing the coated web through the pre-heating and fusion ovens and between the cooled roll and pressure roll.

5. Apparatus for embossing a web comprising, an oven having a lower portion provided with a web outlet, a partition extending upwardly in the oven from the lower end portion thereof, web guiding means provided at the upper end of the partition, said web outlet being arranged to one side of the partition, said oven having a web inlet arranged at a lower portion thereof at the opposite side of the partition, web guiding means adjacent said web inlet, said oven having a heated gas inlet adjacent the web outlet and a gas outlet adjacent the web inlet, a cooled roll adjacent the web outlet, and an embossing belt trained about said roll for engagement by said web moving through the web outlet.

6. Apparatus for embossing a web, an oven having a web inlet opening and a web discharge opening, means for heating said oven, a cooled rotatable roll arranged outside the oven adjacent said discharge opening, a movable embossing belt trained taut about said cooled roll, means for pulling a web through the oven and through the discharge opening, and said pulling means being arranged in a position to maintain the web in engagement with the embossing belt as the belt moves about the cooled rotatable roll.

7. Apparatus for curing and embossing a plastic coated web, an oven having an inlet opening and an outlet opening for the web, means for heating the oven, a cooled rotatable roll mounted in close proximity to said discharge opening, a movable embossing belt trained about said cooled roll, means for maintaining the embossing belt taut about the cooled roll, a pressure roll arranged parallel with the cooled roll and mounted for bodily movement towards the axis of the cooled roll, and means for guiding the web through the oven and to the position between the pressure roll and the embossing belt as it moves about the cooled roll.

MARVIN W. DITTO.
RICHARD H. HUGGER.

REFERENCES CITED

The following references are of record in the file of this patent:

UNITED STATES PATENTS

| Number | Name | Date |
| --- | --- | --- |
| 1,130,846 | Schneebeli | Mar. 9, 1915 |
| 1,177,006 | Arnold | Mar. 28, 1916 |
| 1,472,884 | Pater | Nov. 6, 1923 |
| 1,551,913 | Smith | Sept. 1, 1925 |
| 1,580,957 | Chaffee et al. | Apr. 13, 1926 |
| 1,702,161 | Huppuch | Feb. 12, 1929 |
| 2,387,631 | Weir | Oct. 23, 1945 |

FOREIGN PATENTS

| Number | Country | Date |
| --- | --- | --- |
| 285,816 | Great Britain | June 17, 1929 |